United States Patent [19]
Kunze et al.

[11] Patent Number: 4,715,256
[45] Date of Patent: Dec. 29, 1987

[54] FUEL ELEMENT SHEARS HAVING A STEPPED BLADE

[75] Inventors: Peter Kunze, Leimersheim; Werner Kirsch, Bruchsal-Bückenau, both of Fed. Rep. of Germany

[73] Assignee: Wiederaufarbeitungsanlage Karlsruhe Betriebsgesellschaft mbH, Eggenstein-Leipoldshafen, Fed. Rep. of Germany

[21] Appl. No.: 929,403

[22] Filed: Nov. 10, 1986

[30] Foreign Application Priority Data

Nov. 19, 1985 [DE] Fed. Rep. of Germany ....... 3541000

[51] Int. Cl.$^4$ .......................... G21C 19/36; B26D 1/00
[52] U.S. Cl. ......................................... 83/694; 83/409; 83/636; 83/923; 225/6; 29/426.4; 29/723; 376/261
[58] Field of Search ................... 376/261, 260; 83/694, 83/923, 636, 440.1, 409; 225/6; 29/723, 426.4, 400 N

[56] References Cited

U.S. PATENT DOCUMENTS

| | | | |
|---|---|---|---|
| 3,039,343 | 6/1963 | Richards | 83/694 |
| 3,807,018 | 4/1974 | Ehrman et al. | 29/723 |
| 4,041,821 | 8/1977 | Galter | 83/923 |
| 4,056,052 | 11/1977 | Weil et al. | 83/694 |
| 4,186,657 | 2/1980 | Weil et al. | 83/694 |
| 4,528,879 | 7/1985 | Eisenacher | 83/694 |
| 4,566,361 | 1/1986 | Dubost et al. | 83/694 |

FOREIGN PATENT DOCUMENTS 2009081 7/1976 Fed. Rep. of Germany.

Primary Examiner—Donald P. Walsh
Assistant Examiner—Daniel Wasil
Attorney, Agent, or Firm—Walter Ottesen

[57] ABSTRACT

Horizontal fuel element bundle shears have a stepped blade and a horizontal magazine for accommodating an undismantled uclear reactor fuel element which is to be cut up. In the fuel element bundle shears, the nuclear reactor fuel element, for the cutting operation to be performed, is pushed with a stepwise movement through a magazine opening in front of which the stepped blade is displaceable in a direction perpendicular to the longitudinal axis of the fuel element. Each portion of the stepped blade has a cutting edge. In order to achieve a lower rate of wear of the stepped blade while at the same time obtaining a good cut and a low cutting force, the stepped blade has two cutting edges which are separated from each other by a step, thereby forming two blade portions which are in superposed relationship with each other. The lower blade portion is set back with its cutting edge relative to the cutting edge of the upper blade portion by a step distance which corresponds at least to the width of the precompacted fuel element bundle. The upper cutting edge is higher or longer than the lower cutting edge. Because of this configuration, the two blade portions, which are separated by a step, do not come into engagement with the bundle simultaneously but instead engage the bundle sequentially.

2 Claims, 1 Drawing Figure

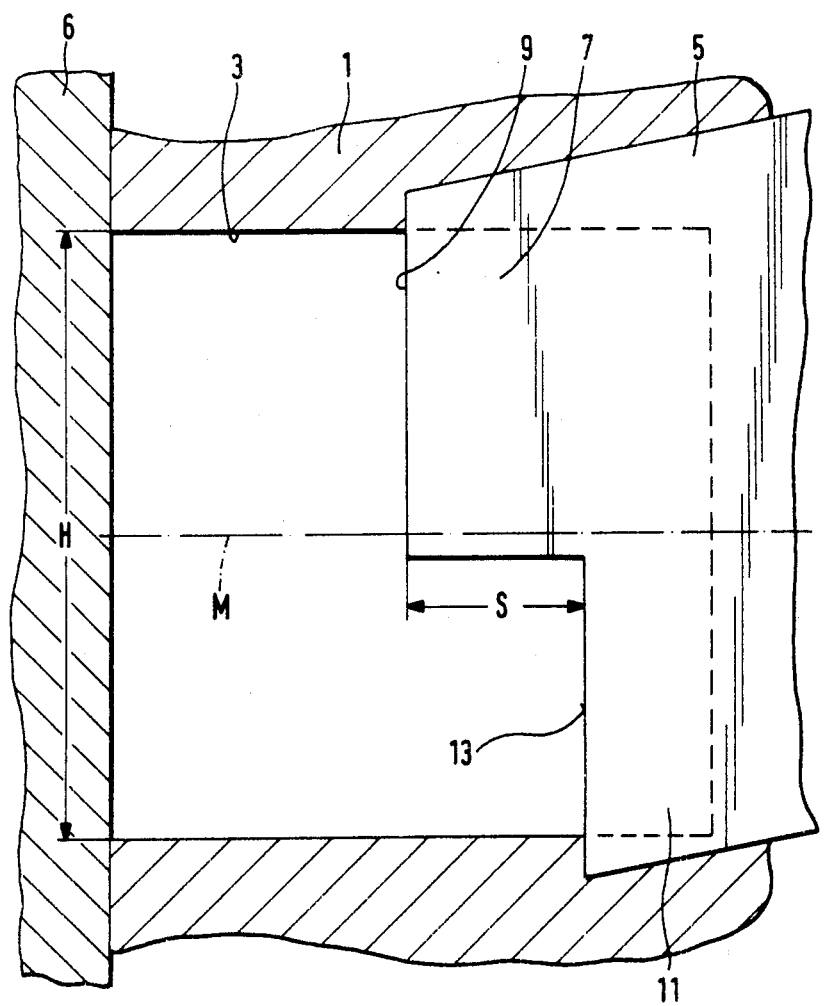

४,७१५,२५६

FUEL ELEMENT SHEARS HAVING A STEPPED BLADE

FIELD OF THE INVENTION

The invention relates to horizontal fuel element shears which includes a horizontal magazine for accommodating an undismantled nuclear reactor fuel element which is to be cut. For the cutting operation, the fuel element is pushed stepwise through an opening of the magazine. The stepped blade is mounted so as to be movable in front of the opening in a direction perpendicular to the longitudinal axis of the fuel element.

BACKGROUND OF THE INVENTION

When cutting a complete, precompacted fuel element bundle using a fuel element bundle shears in a reprocessing facility, there is a need for the fuel element bundle to be cut with as low a cutting force as possible in order to obtain good opening cross sections and in order to minimize the wear at the shears.

It is known from German Pat. No. 20 09 081 to use stepped blades for fuel element bundle shears, which have a large number of blade steps. In this way, the fuel element bundle is severed gradually by a large number of small steps. The blade steps in this arrangement have a staircase-like configuration. During the cutting operation, all the steps are in engagement with the bundle to be cut at a given time so that the blade force presses against the entire surface of the fuel element bundle.

It has been determined that a stepped blade of this kind is subject to a high rate of wear as the corners and edges are subjected to a very high loading. This results in the stepped blade having a relatively short service life. It was also found that there is the disadvantage that the opening cross sections of the cut fuel rod segments deteriorate as the fuel rod tubes can penetrate into the corners and edges of the steps of the blade. However, in order to reliably control the process of breaking up the nuclear fuel, it is necessary for the opening cross sections to be in as unsquashed a form as possible.

SUMMARY OF THE INVENTION

It is an object of the invention to provide fuel element shears of the kind described above which includes a blade which is subjected to less wear while at the same time permits a good cut through the fuel element bundle with a reduced cutting force with the opening cross sections of the fuel rod tubes being only slightly or not at all squashed.

According to a feature of the invention, the fuel element shears has a stepped blade with two cutting edges which are separated from each other by a step to provide two blade portions in superposed relationship so that the lower blade portion is set back with its cutting edge relative to the cutting edge of the upper blade portion by a step depth which corresponds at least to the width of the precompacted fuel element bundle, and that the upper cutting edge is dimensioned to be higher or longer than the lower cutting edge.

It is particularly advantageous that by means of the invention the lower blade portion only comes into engagement with the fuel element bundle when the upper blade portion has already severed the bundle. This configuration according to the invention provides that the cutting force is always concentrated only at the cutting edge of one blade portion. This results in the amount of cutting force required being reduced. The fact that the two stepped blades come into engagement with the material to be cut sequentially advantageously causes the peaks in force to be uniform during operation of the two blade portions. That reduces the level of the thrust force to be produced by the hydraulic system on the piston of the cutting cylinder unit for cutting a fuel element bundle which, in turn, leads to a reduction in the amount of time required for each cutting operation.

The height of the upper cutting edge is greater than half the magazine opening; whereas, the height of the lower cutting edge is less than half the magazine opening. This asymmetric configuration of the cutting edges provides that the upper cutting edge begins below the center of the magazine opening and cuts a major part of the cross section of the fuel element bundle. The lower cutting edge cuts through the remainder of the cross section of the fuel element bundle.

This measure has another advantageous influence with respect to rendering the cutting forces uniform at the two cutting edges during the cutting operation. This effect is attributed to the fact that the clearance between the stationary blade and the stepped blade constantly increases during the cutting operation as the blade carriage probably experiences an upward tilting movement in its guide. This results in a reduction in the shearing component of the cutting force and an increase in the bending component which makes an only immaterial contribution to cutting of the fuel element bundle.

In this way, the second lower blade portion has a greater clearance during the cutting operation, but cuts a smaller number of fuel rods in the precompacted fuel element, and as a result requires only the same level of cutting force as the upper blade step. The fact that the cutting force at the stepped blade is advantageously minimized imparts a longer service life to the stepped blade as lower cutting forces also give rise to a lower degree of wear. The greater service life of the stepped blade results in a higher level of installation availability. The amount of wear in the control members of the hydraulic system is also reduced.

In an advantageous embodiment of the invention, the height of the upper cutting edge is equal to half the height of the magazine opening plus 2 to 10% of the total height of the magazine opening. The cutting force of the two cutting edges is then almost the same and the opening cross sections are of almost equal and good quality over the entire cut fuel element bundle.

BRIEF DESCRIPTION OF THE DRAWING

The invention will now be described with reference to the single figure wherein a front elevation view, partially in section, of fuel element shears according to the invention is shown.

DESCRIPTION OF THE PREFERRED EMBODIMENT OF THE INVENTION

The housing 1 of horizontal fuel element shears for cutting a fuel element bundle has a magazine opening 4 which is approximately square. Movably mounted in front of the magazine opening 3 is a pressure-actuable stepped blade 5 by means of which the fuel rods of the nuclear reactor fuel element bundle are to be sheared off at the fixed blade 6. The force applied to the stepped blade can be a hydraulic force generated by hydraulic pressure means.

The stepped blade 5 has an upper blade portion 7 having a cutting edge 9. The height or length of the cutting edge 9 is larger than half the height H of the magazine opening, preferably, by an amount from 2 to 10% of the total height H of the magazine opening. By virtue of this arrangement, the blade portion 7 extends with its cutting edge 9 downwardly beyond the horizontal center line M of the magazine opening 3.

The stepped blade 5 has a lower blade portion 11 which is set back with respect to the upper blade portion 7. The blade portion 11 has a cutting edge 13 whose height or length is less than half the height H of the magazine opening. The step S between the two blade portions 7 and 11 corresponds to the width of the precompacted fuel element bundle which is to be cut.

The mode of operation of the above-described apparatus is described below.

For the cutting operation, the stepped blade 5 is subjected to hydraulic pressure and moves towards the left, relative to the magazine opening 3. In this movement, the first blade portion 7, with its cutting edge 9, begins to shear the fuel element bundle. In this cutting operation, the fuel element bundle will deflect slightly into the lower region. After the upper blade portion 7 has passed across the width of the precompacted fuel element bundle and has sheared the fuel rods in the upper region thereof, the lower blade portion 11 follows in the course of the further movement of the blade 5. The blade portion 11 now comes into shearing operation with its cutting edge 13, and shears off the remaining fuel rods of the fuel element bundle.

It is understood that the foregoing description is that of the preferred embodiments of the invention and that various changes and modifications may be made thereto without departing from the spirit and scope of the invention as defined in the appended claims.

What is claimed is:

1. A fuel element shearing apparatus for shearing a fuel element having a plurality of fuel rods having a predetermined precompacted width and defining a longitudinal axis, the shearing apparatus comprising:
   a horizontal magazine adapted for receiving an undismantled nuclear reactor fuel element to be sheared and having a magazine opening through which the fuel element is incrementally pushed during the shearing operation;
   a stepped blade having only two shearing edges and being movably mounted in front of said opening for movement thereacross in a direction perpendicular to said longitudinal axis for shearing first and second portions of said fuel element, respectively;
   one of said shearing edges being an upper shearing edge and the other one of said shearing edges being a lower shearing edge, said lower shearing edge being disposed rearwardly of said upper shearing edge so as to cause said lower shearing edge to be disposed a step distance away from said upper shearing edge;
   said step distance being adapted to correspond to at least said width of the precompacted fuel element so as to cause said upper shearing edge and said lower shearing edge to shear said first and second portions sequentially; and,
   said upper shearing edge having a length longer than the length of said lower shearing edge.

2. The horizontal fuel element shearing apparatus of claim 1, said magazine opening having a predetermined overall height H, said upper shearing edge having a length L lying in the range of $\leq L \leq$.

* * * * *